(12) United States Patent
Tozzi

(10) Patent No.: US 7,308,429 B1
(45) Date of Patent: Dec. 11, 2007

(54) ELECTRONIC WITHDRAWAL AUTHORIZATION STORE AND FORWARD FOR CASH AND CREDIT ACCOUNTS

(76) Inventor: Mario S. Tozzi, 243 W. Post Rd., Apt. K, White Plains, NY (US) 10606

( * ) Notice: Subject to any disclaimer, the term of this patent is extended or adjusted under 35 U.S.C. 154(b) by 0 days.

(21) Appl. No.: 09/500,203

(22) Filed: Feb. 8, 2000

(51) Int. Cl.
*G06Q 40/00* (2006.01)
(52) U.S. Cl. ...................................... 705/39
(58) Field of Classification Search .............. 705/39, 705/44, 64, 74, 75; 235/379, 380
See application file for complete search history.

(56) References Cited

U.S. PATENT DOCUMENTS

| | | | |
|---|---|---|---|
| 5,326,960 A * | 7/1994 | Tannenbaum | 235/379 |
| 5,650,604 A * | 7/1997 | Marcous et al. | 235/379 |
| 5,677,955 A * | 10/1997 | Doggett et al. | 705/76 |
| 5,768,385 A * | 6/1998 | Simon | 705/69 |
| 5,815,665 A | 9/1998 | Teper et al. | |
| 5,845,260 A * | 12/1998 | Nakano et al. | 705/26 |
| 5,953,710 A * | 9/1999 | Fleming | 705/38 |
| 5,963,647 A * | 10/1999 | Downing et al. | 705/39 |
| 6,000,832 A * | 12/1999 | Franklin et al. | 700/232 |
| 6,014,650 A * | 1/2000 | Zampese | 705/44 |
| 6,205,346 B1 * | 3/2001 | Akiva | 705/65 |
| 6,226,624 B1 * | 5/2001 | Watson | 705/44 |
| 6,263,447 B1 * | 7/2001 | French | 713/201 |
| 6,370,514 B1 * | 4/2002 | Messner | 705/14 |
| 6,912,510 B1 * | 6/2005 | Shepherd | 705/37 |

OTHER PUBLICATIONS

Clifford German, "Sorry, dad, can you send cash and quick", The Independent, London (UK), May 18, 1997, p. 17.*

* cited by examiner

*Primary Examiner*—Hani M. Kazimi
(74) *Attorney, Agent, or Firm*—Milde & Hoffberg, LLP

(57) ABSTRACT

A system for collecting, storing and forwarding account approval information to hosts and terminals performing transactions between each other, enabling an accountholder to authorize withdrawals and charges to his account by someone other than the accountholder which comprises an input terminal in which a source accountholder provides data indicating a source account at an institution from which funds will be paid, a cap value on the amount of the funds to be made available, authorization, and a secret code, all of which are transmitted to a trigger server which stores account information, authorization and secret code; and a requesting terminal at which the first person to enter the secret code is provided the source account approval information for a request for funds up to the cap limit to the institution in which the previously provided source account is maintained.

37 Claims, 4 Drawing Sheets

ELECTRONIC WITHDRAWAL AUTHORIZATION STORE AND FORWARD FOR CASH AND CREDIT ACCOUNTS

The invention is concerned with a money transfer support system for cash and credit accounts, capable of collecting, storing and forwarding the account's approval information used in electronic credit and debit transactions by terminals and hosts over a network. The invention is also concerned with a method by which an institution D triggers a financial transaction between a terminal A and a host B, by supplying authorization for the account from which funds should be withdrawn, without participating in the transaction itself or in any settlement related to the transfer of the funds. It comprises a system and method that avoids unnecessary liabilities, cash flow implications and regulatory complexities applicable to the usual institutions C providing money transfer services, so far only capable of doing so by collecting funds from the source account institution and disbursing it to the target beneficiary. The letters A-D refer to the Figs. and their descriptions in the specification below.

The invention also provides a system and method that allows an accountholder to authorize charges and withdrawals to be presented later by someone other than the accountholder and who may have no relationship to the institution where the accountholder's account is maintained. The method of the invention uses a money transfer support system capable of triggering a direct financial transaction between a terminal A and a host B, enabling authentication, compliance checking and settlement for the transfer of the funds to happen directly between the collection terminal's institution and the institution where the source account is maintained and from where funds are to be made available.

BACKGROUND OF THE INVENTION

With the advent of globalization and now overwhelmingly by the arrival of the Internet, institutions and individuals face new challenges and seek new methods for facilitating financial transactions between parties domestically and internationally. The credit and debit card network has been the subject of prior art related to electronic money transfers using ATM machines, point of sale and other terminals. They provide solutions for performing funds transfer between a source account maintained by an institution affiliated with a network and individuals or entities with access to collection terminals on the network.

Tannenbaum, U.S. Pat. No. 5,326,960 (Jul. 5, 1994) and Brody et al., U.S. Pat. No. 5,350,906 (Sep. 27, 1994) describe the use of the ATM bank network to provide money transfers via fixed limit ATM cards. They describe a system where senders using temporary ATM cards and secret codes, transfer funds to a "master account" on a centralized computer, to which the beneficiary has access by using another temporary collecting card and the matching secret code previously assigned to the funds by the sender.

The system is an evolution over traditional money transfer methods used by specialized money transfer institutions like Western Union and MoneyGram. Terminals on the ATM bank network provide a 24 hours/day×7 days/week collection point for the beneficiary to pick-up the funds instead of having to rely on pick-up offices, clerks and business hours.

Marcous et al., U.S. Pat. No. 5,650,604, (Jul. 22, 1997) describe a cardless electronic money transfer method, based on ATM machines and on a secret code. It discloses a system where first, a customer, using an ATM, presents a request to the institution providing the money transfer, to withdraw a specific amount of funds from his account so that funds can be available to the one who first presents the secret code assigned to the funds. The second part of the transaction occurs when another individual requests the assigned funds, from the same or other ATM machine presenting only the secret code. The institution C providing the money transfer service will then disburse the code's value to the first presenter of the fund's secret code.

The system is similar to the one from Tannenbaum and Brody suppressing the use of temporary ATM cards and based exclusively on a secret code given to the sender by the input terminal at the purchase of the service. It also uses the same two-step processes where first, a sender using an ATM machine provides funds to be assigned to a secret code, and second, the money is disbursed to the one who first presents the matching secret code assigned to the funds.

Doggett et al, in U.S. Pat. No. 5,677,955 (Oct. 14, 1997) describe an electronic money transfer instrument suitable to institutions effecting a transfer of funds from an account of a payer in a funds-holding institution to a payee. The system can be portrayed as an electronic substitute for a check used to transfer funds from a source account at a financial institution to a beneficiary.

Simon, in U.S. Pat. No. 5,768,385 (Jun. 16, 1998) attempts to eliminate the plastic card, basing his electronic transaction model solely on a secret code. His system provides a standard protocol for financial institutions to create electronic "coins" and allow them to be exchanged between several banks all committed to disburse the value of a coin to the first presenter of the coin's secret code. It describes the use of one-way functions, encryption and mathematical algorithms so that only the possessor of the secret code could have access to a coin's funds. It is a broad expansion of the previous art assuming a mathematical and cryptographic model where electronic "coins" are exchanged among several banks, all committed to disburse a coin's value to the first presenter of the coin's electronic secret code.

Downing, et al, in U.S. Pat. No. 5,963,647 (Oct. 5, 1999) also rely on a secret code for their money transfer method. The system is another implementation of the coin-based money transfer model where funds are not collected from the source account until the second step of the transaction when a request is issued by the beneficiary at a collection terminal. The institution C providing the money transfer will only then collect the requested amount of funds from the source account institution B and disburse it to the beneficiary requesting the transaction on a collection terminal A. The method also describes the implications of international settlements, compliance regulations and exchange rate conversions.

Current systems and methods described in the prior art, though, present a similar problem related to their efficiency, complexity and liability. Institutions providing money transfers—either through the traditional method, with full disclosure of the target beneficiary by the sender or through the electronic coin method, recognizing the beneficiary through a secret code—are responsible for the collection and delivery of the funds. Funds collected from the source account institution are given to either the specified target beneficiary provided by the sender or to the first presenter of the coin's electronic secret code. The institution that provides the money transfer service C is assumed by the prior art to be responsible for settlement with both institutions involved in the transaction, collecting the funds from the institution where the source account is maintained B and delivering it to the institution that maintains the collection terminal A.

Funds are collected either at the first step when the service is established and the target beneficiary or secret code is assigned or at the second step when funds are requested by the collection terminal and delivered to the ultimate beneficiary. When providing money transfers through any of the previous methods, institutions require connectivity and settlement capabilities with both the source account institution B and the institution that maintains the requesting terminal A.

As a result of the dual-entry system (accounting credits and debits) and its money accountancy implications, the process of collecting and disbursing funds creates a lock on institution's liability and cash flow requirements, growing it proportionally with increasing volume of transactions and the corresponding receivable-payable contract commitment dates (settlements). The problem derives from the fact that institutions cannot guarantee delivery of funds they do not possess and that is why commitments are previously established for their collection with the institution that maintains the source account B prior to guaranteeing its subsequent availability to the collection terminal A.

The electronic coin model as well as the traditional money transfer model used by banks and other specialized money transfer institutions like Western Union and MoneyGram presents a further problem related to the legal burdens of said institutions. In order to provide money transfers, the institutions have to collect, store and disburse someone else's funds. Consequently, they are required to be financial institutions regulated by banking departments. That implication exposes companies to the extensive regulatory complexities applied to institutions capable of holding and disbursing other people's money.

Institutions are also required to have sufficient cash flow in order to pay for transactions for which money has not yet been received from the source account institution B since commitments for the delivery of the funds to the collection terminal A happen prior to the settlement for the transfer of the funds between the institution that maintains the source account B and the institution that temporarily holds the funds C. Institutions C providing money transfers through present methods are required to perform two financial transactions, first collecting the money from the institution B where the source account is maintained and then transferring it to the institution A maintainer of the requesting terminal (ATM, POS, etc. . . . ).

Such unavoidable cash flow and liability burdens derived from the dual-transaction process (collection and disbursement) are impacts that money transfer service provider institutions C will face under the methods of Tannenbaum, Brody et al, Marcous et al, Doggett et al, Simon and Downing, et al. That impact is likely to produce higher operational costs and higher service prices to the final consumer. In contrast, the system of the invention relies on a direct financial transaction scheme that not only provides more flexibility, but also eliminates unnecessary liabilities and limitations derived from the previous methods.

The introduction of a third company, the service provider company C to serve as a temporary storage for the funds and to which funds are to be transferred to, and from which then transferred or disbursed; elevates the complexity of the money transfer model leading to additional overheads and diminishing its effectiveness. The system and method of the invention allows the trigger server D to provide other hosts and terminals with accounts and account approvals, triggering transaction requests between terminals and hosts, and not participate in the transaction itself or in any settlement related to the transfer of the funds.

In current systems and methods, institutions are required to establish connections to both other institutions involved in the transaction. Said money transfer institutions C are portrayed by previous methods as responsible for conducting and controlling the transfer of the funds; arranging for the collection of the funds from the source account provided and for its subsequent transfer to the terminal requesting the transaction. Institutions C performing money transfer through said methods require settlement capabilities with both institutions involved in the transaction. The institution that provides the money transfer service C is ultimately the one responsible for approving and delivering funds to the institution maintainer of the collection terminal A on all previous money transfer methods.

The specifics of the method by which the trigger server provides hosts and terminals with the source account component of a transaction, as well as possible response interactions between terminals and hosts and the trigger system will become apparent to those skilled in the art from the description which follows.

SUMMARY OF THE INVENTION

It is an object of the invention to provide a money transfer support system for cash and credit accounts, which allows an institution to collect, store and forward account approval information used by terminals and hosts in electronic credit and debit transactions over a network, without participating in the transaction itself or in any settlement related to the transfer of the funds.

It is a further object of the invention to provide a system that allows accountholders to authorize withdrawals and charges to be presented by someone other than the accountholder and who may have no relationship to the institution where the account is maintained.

It is an object of this invention to provide a system that is free of the problems that prior systems had.

It is a further object of the invention to provide a system that eliminates unnecessary liabilities and cash flow implications of prior systems.

It is a further object of the invention to provide a system where funds are delivered directly from the source account institution to the requesting terminal despite the fact that source account and approval information for the transaction are obtained from a third party institution.

It is a further object of the invention to provide a system where the service provider institution is not required to be participant in the actual financial transaction between the requesting terminal and source account institution.

These objects, as well as further objects which become apparent from the discussion that follows, are achieved, in accordance with the present invention, by a system capable of collecting, storing and forwarding account approval information to terminals and hosts, enabling account withdrawals and charges to be presented by someone other than the accountholder with comprises:

a) an input terminal in which a source accountholder provides data indicating a source account at an institution from which funds will be paid, a cap value on the amount of the funds to be made available, authorization, and a secret code, all of which are transmitted to b) a trigger server which stores source account information, authorization and secret code; and c) a requesting terminal at which the first to provide the secret code is given the source account approval information for a transaction up to the cap limit to the institution in which the previously provided source account is maintained.

The input terminal may be an automated teller machine, a credit or debit card block, a point-of-sale machine, a personal computer, a lotto machine, a touch-tone telephone, a fax machine, or a wireless device, e.g., a cellular phone.

The input terminal may generate a random secret code or may receive one from the sender via keyboard input, digitally, optically or magnetically. The input terminal may also include a barcode or other optical reader. The input terminal may also include a printing device, a magnetic-card writer, or a magnetic card reader. The secret code may be printed as numbers, letters, symbols or barcodes, or may be magnetically or digitally recorded. The requesting terminal may be an automated teller machine, a credit or debit card block, a point of sale machine, a personal computer, a lotto machine, a touch-tone telephone or a fax machine. The requesting terminal may also include a barcode reader or a magnetic card reader. The requesting terminal may be a wireless device, e.g., a cellular phone.

The invention also comprises a method for institutions to collect and supply account approval information for transactions between terminals and hosts also enabling account withdrawals and charges by someone other than the accountholder, which comprises:

a) an accountholder providing data indicating a source account at an institution from which funds will be paid, a cap value on the amount of the funds to be made available, authorization, and a secret code, all of which are transmitted to:

b) a trigger server which stores account information, authorization and secret code; and c) a requesting terminal at which the first to provide the secret code is given the source account approval information for a transaction up to the cap limit to the institution in which the previously provided source account is maintained.

The source account may be a credit account, a checking account, a savings account, a money market account, an investment account, or a telephone account. The accountholder may be charged a service charge at the input terminal. Alternatively or additionally, a service charge may be charged at the requesting terminal. The method for supplying terminals and hosts account approval information, enabling account withdrawals and charges by someone other than an accountholder which comprises the step of entering the secret code at a requesting terminal may further comprise a step of receiving actual currency from the sender.

The method may also comprise the additional step of the beneficiary entering an alternative account to where money may be remitted. The beneficiary account may be a checking account, a money market account, an investment account, or a savings account. The beneficiary account may be provided via a magnetic card, keyboard input, or a barcode. The step of entering the secret code at a requesting terminal may further comprise a step of entering personal identification via a keyboard, a magnetic card, or a barcode.

In the trigger system, the trigger server D does not participate in the money transfer transaction itself, and therefore, is required only to connect to either the terminal A or the host B involved on the transaction. This allows for more flexibility, control and easier implementation. When a trigger request is issued by a terminal connected to the trigger server (FIG. 3), the terminal A first obtains the source account approval information from the trigger server D, before connecting to its host B to seek approval for the transaction. When a trigger request is issued by a host B connected to the trigger server D (FIG. 4), the collection terminal A connects first to its host B, providing instead of the source account approval information, the trigger to be used in order for the host B to acquire the source account approval information from the trigger server D. In a trigger host-to-host connection, it is a responsibility of the host B to request the source account approval information from the trigger server D using the secret code provided by its requesting terminal A.

In both cases, a single connection from terminal A or host B to the trigger server D is sufficient to provide all the necessary information required by terminal A and host B so that a transaction can be attempted, approved or denied.

Also, all implications related to the actual transfer of the funds—such as authorization, collection, payment, terms, limits, exchange, compliance, settlement, etc—are relegated to the two actual parties involved in the transaction without the participation of the trigger institution D, thereby allowing for easier integration to currently deployed hosts and terminals. The trigger system uses the same infrastructure by which a terminal A would normally request a transaction from its host B, as a credit or a debit card transaction over an ATM; and operates as if the terminal had received the source account approval information not from the trigger server, but from the source account accountholder himself, at the terminal, at the time of the transaction request. In the same way, hosts connected to the trigger system approve or disapprove transactions from their terminals using source account approval information provided by the trigger server, as if it had been received by its terminal in a regular transaction.

The system and method of the invention allows terminals and hosts equipped with enabling software, to collect the source account approval information from the trigger system, outside their private transaction and report its approval or denial at the end of the transaction. It is a disconnected system designed in a way that the collection terminal institution A and the source account institution B are the ones performing the transaction, including verification, settlement, exchange rate conversion and compliance checking among each other without the participation of the institution that provides the source account approval information D.

PREFERRED EMBODIMENTS OF THE INVENTION

Figure 1:
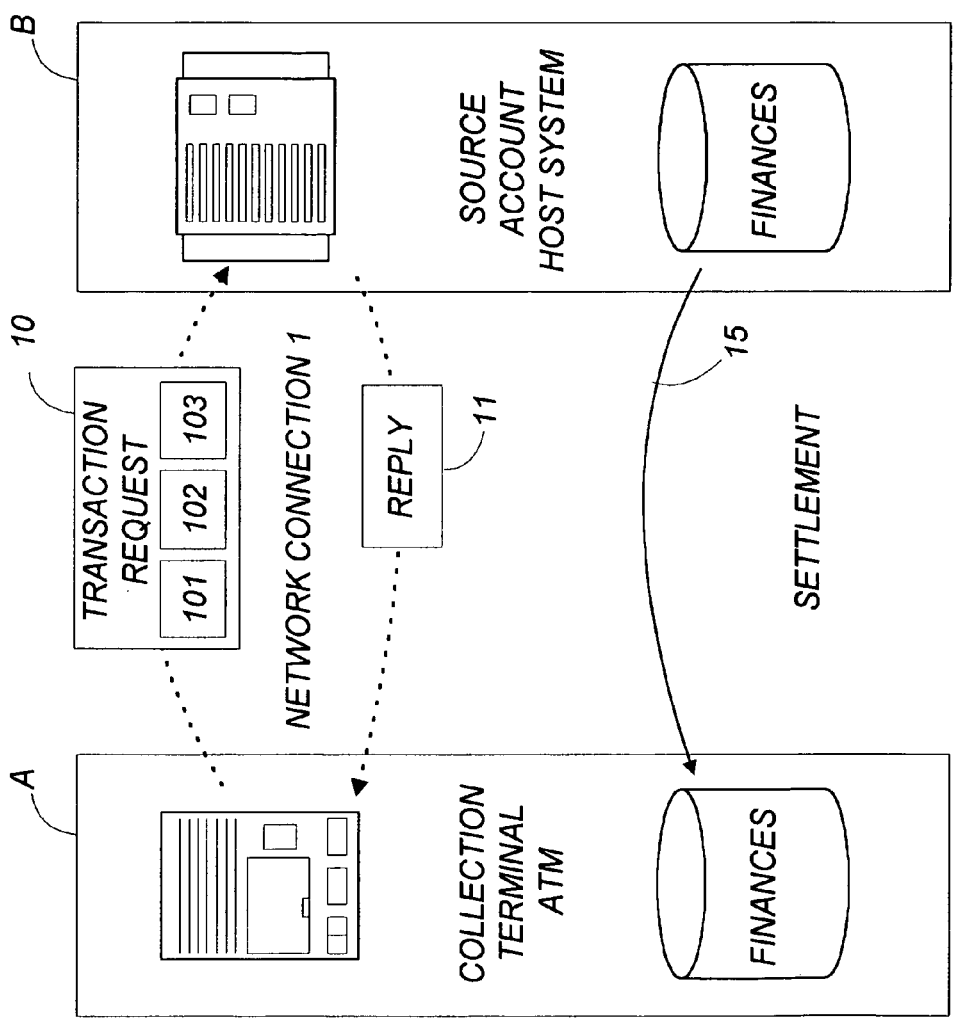
FIG. 1 is a diagram of a common single electronic transaction method for charges and withdrawals.

FIG. 1 is a diagram of a common single electronic transaction method for charges and withdrawals. An individual uses a collection terminal (ATM) from the institution A that maintains the ATM to request a transaction 10 from the institution B that maintains the source account. The request is comprised of source account information 101, target account or requesting terminal identification 102 and an amount for the funds transfer 103. This request is transmitted over network connection 1 to the source account host system B, which then checks its database and replies 11 to the transaction request 10 granting approval or denying the request. In case of approval on reply 11, funds are transferred 15, from Finances at the institution in which the source account is maintained B to Finances at the institution that maintains the collection terminal A to cover for money dispensed by the collection terminal A to the individual requestor of transaction 10.

Figure 2:
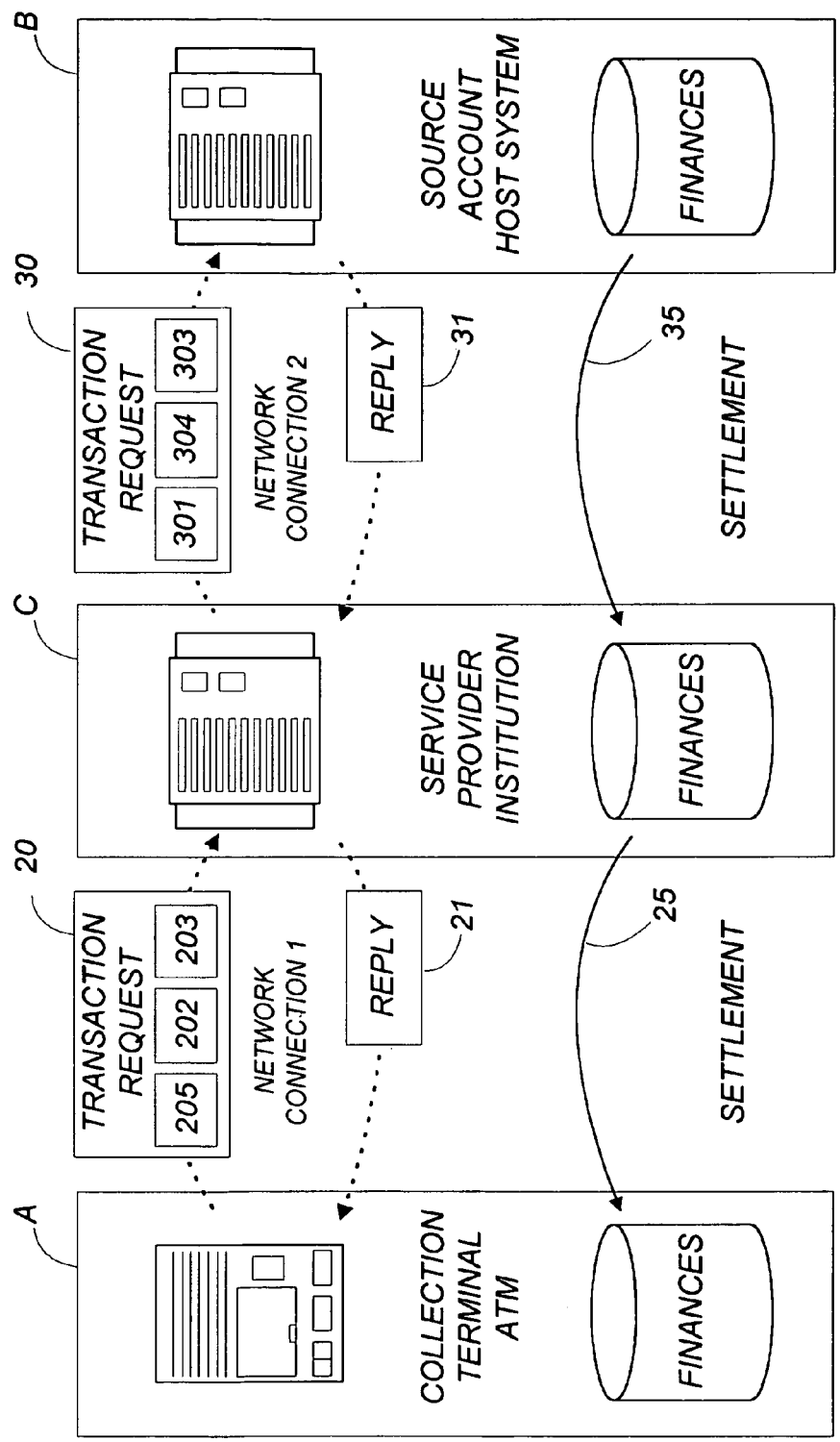
FIG. 2 is a diagram of a previous money transfer transaction using current money transfer methods.
Figure 3:
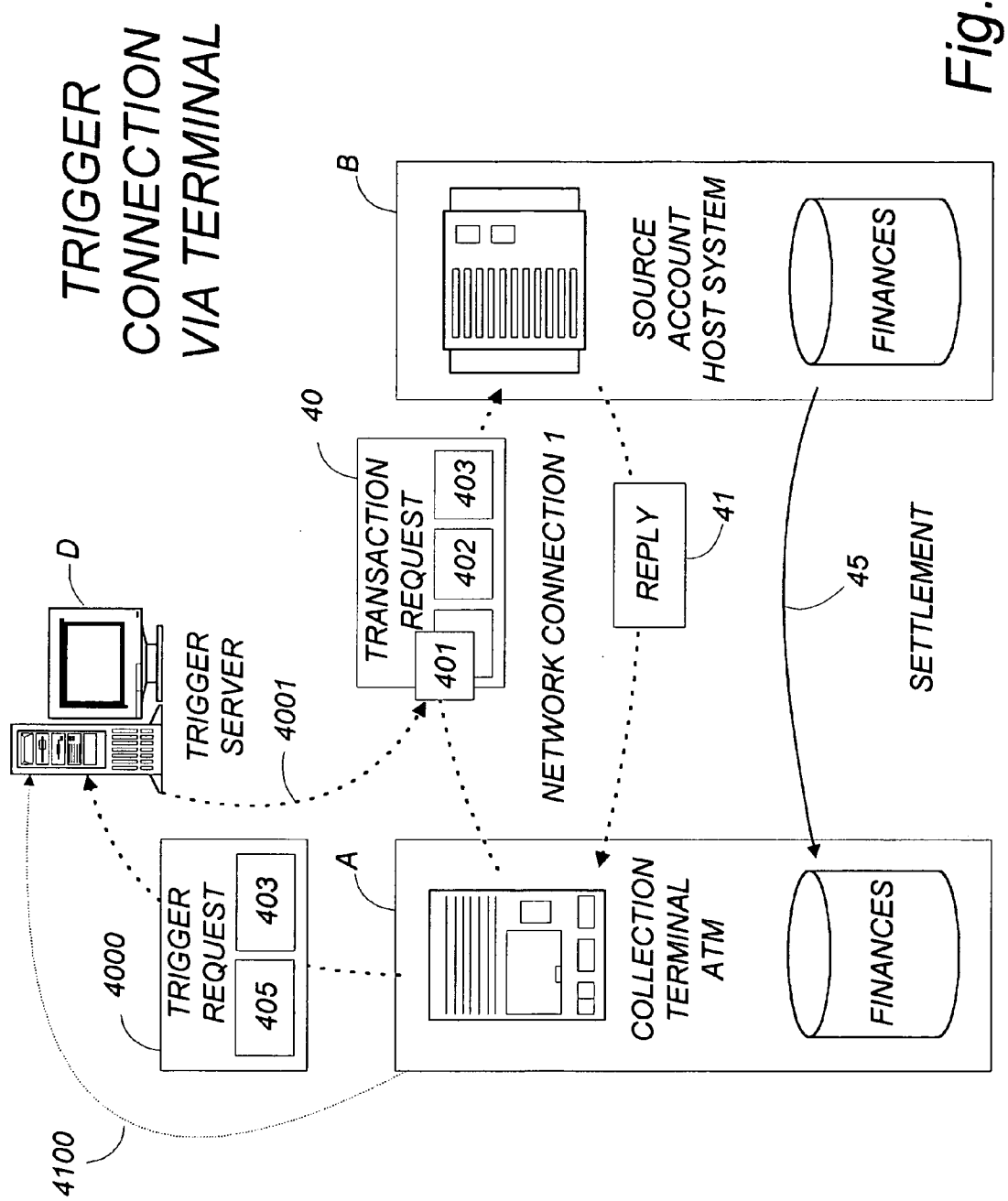
FIG. 3 is a diagram of the system of the invention which provides remote cardless approval through triggers via a terminal connection.
Figure 4:
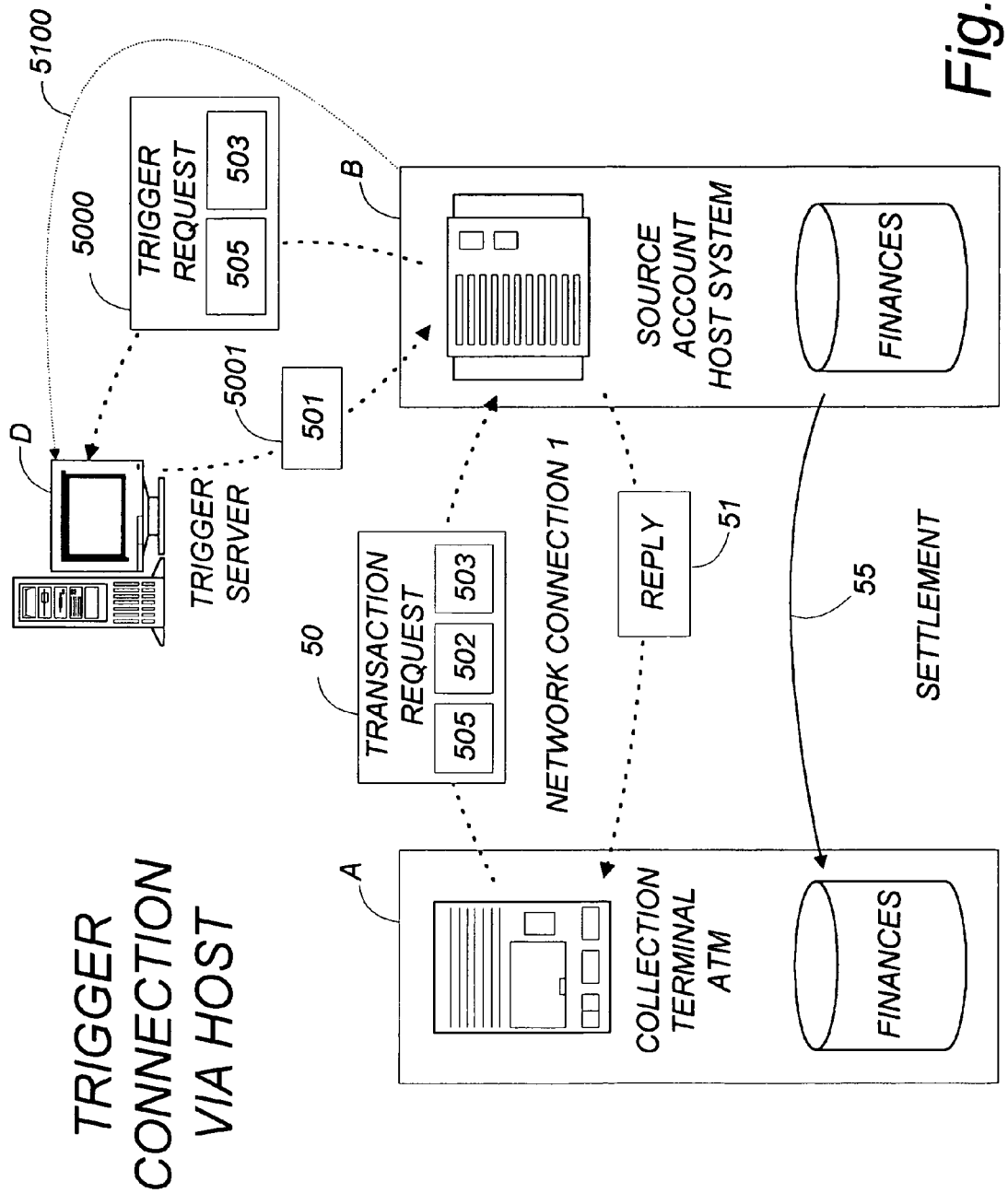
FIG. 4 is a diagram of the system of the invention which provides remote cardless approval through triggers via a host connection.

FIGS. 2, 3 and 4 are diagrams that exemplify a receiver attempting the collection of funds sent to him by a sender. FIG. 2 illustrates a money transfer transaction using previous money transfer methods and FIGS. 3 and 4 display two different implementations of the trigger method of the invention. FIGS. 2, 3, and 4 assume that the first step of the transaction has already occurred and that the sender of the funds has already established a secret code over a source account for a particular amount.

FIG. 2 is similar to FIG. 1, in that an individual at the collection terminal from the institution A that maintains it, inputs a transaction request 20 consisting of a secret code 205, a target account or requesting terminal identification 202 and an amount for the funds transfer 203, which are transmitted over network connection 1 to the service provider institution C, which then through network connection 2 transmits request 30 to the institution B that maintains the source account, the request being comprised of: the source account information 301 corresponding to the input secret code 205, the target identification 304 for institution C temporary holder of the funds and the amount for the transfer of the funds 303. In case the institution in which the source account is maintained B approves request 30 via reply 31, the service provider institution C approves transaction 20 via reply 21 to the institution A that maintains the collection terminal. Service provider institution C will then settle the transfer of the funds 25 remitting funds to the institution A that maintains the collection terminal and wait for funds to be transferred in settlement 35 from the institution that maintains the source account B from its finances.

FIG. 3 is a diagram of the system of the invention which provides remote cardless approval through triggers by means of a terminal connection. In it, an individual at the institution A that maintains the collection terminal requests a funds transfer for an amount 403 providing instead of an account approval information, a secret code 405 needed by the trigger request 4000 to acquire the source account information 401 from trigger server D. If reply 4001 is approved, source account information is made available to terminal A, so that terminal A can attempt a transaction request 40 over network connection 1 to the host system at the institution B at which the source account 401 is maintained. The transaction request 40 is comprised of: source account information 401 received from a trigger server D, target account or requesting terminal identification 402, and the amount for the funds transfer 403. A reply 41 to the request 40 from source account institution B to collection terminal A will approve or deny the transfer of the funds. In case of approval on reply 41, settlement for the transfer of funds 45 will occur directly from source account institution B to collection terminal institution A.

An additional connection 4100 from the institution A that maintains the collection terminal to the trigger server D can be optionally used to update the status of the transaction between A and B. The secret code 405 and the amount 403 are the minimum requirements for the redemption of a trigger. Identification for the terminal or host 402 requesting the trigger or the beneficiary account for the funds as well as other additional information may be provided or not to the trigger server, which can operate or not operate in blind mode.

FIG. 4 is a diagram of the system of the invention which provides remote cardless approval through triggers via a host connection. An individual at the collection terminal (ATM) at the institution A that maintains it transmits a transaction request 50 over network connection 1 to a source account institution B. Transaction request 50 is comprised of: a secret code 505, target account or requesting terminal identification 502 and the amount for the funds transfer 503. The host at the institution B responsible for the source account will use the secret code 505 and the amount 503 to generate a trigger request 5000 to the trigger server D. The trigger server D will then approve or deny trigger request 5000 through reply 5001, respectively providing or not providing the source account approval information 501 to the host system B responsible for the source account. In case reply 5001 is successful and source account information 501 is obtained by the host B responsible for the source account, transaction request 50 is processed and analyzed using account information 501 and is approved or denied to the institution A responsible for the collection terminal via reply 51. In case of approval on reply 51, settlement for the transfer of the funds occurs directly from Finances at the source account institution B to Finances at collection terminal institution A.

An additional connection 5100 from the host B that maintains the source account to the trigger server D can be optionally used to update the status of the transaction between A and B. The secret code 505 and the amount 503 are again the minimum requirements for the redemption of a trigger. Additional identification for the terminal or host requesting the trigger or the beneficiary account for the funds 502 as well as other information may be provided or not provided to the trigger server, which can operate or not operate in blind mode Electronic Withdrawal Authorization Store and Forward for Cash and Credit Accounts, herein called triggers, are account services composed of predetermined fixed amount account withdrawal authorizations offered for a fee to the current financial network and its customers using common terminals and protocols. The authorizations are identifiable by a source account, a cap value and a secret code composed of images, bits, barcodes, letters, numbers or letters corresponding to numbers. The secret code authorizations are given to the purchaser as a printout, barcode, magnetically stored on a card or in any other hardcopy form in possession only of its purchaser.

Triggers authorize pre-assigned maximum value withdrawal attempts from predetermined cash and credit accounts. They are value-specific mostly short-term, single-use, pre-approved-charge-requests, which provide cash and credit accountholders, cross terminal remotely triggered cardless withdrawals, money transfers and payment capabilities based on secret codes. They are debit and credit transaction approvals stored under a logical secret code for remote future use.

The trigger's host system will acknowledge by means of a hardcopy receipt at the sale's terminal, the right to a single successful delivery of the stored approval information to the first terminal or host presenter of the matching secret code for a transaction up to its maximum specified amount under its pre-established terms. It uses the standard financial network, terminals and protocols, such as point-of-sale, credit and debit card blocks, ATM machines, computers and other terminals to provide accountholders money transfer and payment capabilities with fixed amount exposure and enhanced flexibility.

Each individual approval information is identifiable by a unique monetary cap-value (balance) and a "secret code" created at the time the Trigger is established. This secret code is again composed of one or many sequences of figures, barcodes, bits, numbers, letters, or letters corresponding to numbers known only by the purchaser. Triggers are price-specific predetermined pending approvals available to anyone with knowledge of its secret code. In order to request the execution of a remote cardless withdrawal, one is required to have knowledge of the secret code and present it to the trigger host system. The secret code is deactivated once successfully exercised or expired.

The use of triggers allows accountholders money transfer and remote cardless withdrawal capabilities across terminals and hosts connected to the trigger host system. Account terminals and hosts equipped with the trigger-enabling software will conduct transactions over the current financial networks and protocols, storing and collecting pre-defined charge attempts to and from logical secret codes. Once a trigger is sold and its cap amount and approval information assigned to a trigger code, any other trigger-enabled terminal on the network can attempt to disburse its value instantly upon code verification.

This code verification occurs directly between credit and debit card terminals and hosts and the trigger approval host system. The trigger host system is responsible for providing the source account approval information for a transaction up to its cap value to whichever beneficiary host or terminal presents the matching secret code. Once approval information is obtained from the trigger server, the transaction is processed by the terminal and host involved and is authorized or denied.

The trigger host system sells account approval information storage for a single value-specific withdrawal attempt during the trigger's lifetime. It provides speed, flexibility and security to cash and credit accountholders by giving them a disposable fixed amount approval, less risky and more easily exchangeable than a cardholder's long-term cash and credit account information. Such flexibility is especially useful over unreliable media such as the Internet. Hardware and software capabilities of each terminal will determine the extent of its features such as charge verification, cash disbursement, funds to account forwarding, etc. Regulations for each terminal as well as its type and location will also determine its limitations.

Triggers allow control over the amount and therefore liability customers transmitting funds are willing to incur during the transaction. It adds an extra layer to the current single step charge approval method (see FIG. 1), separating it into two pieces, source account collection and execution. It gives accountholders flexibility and better risk-management against the present unshielded single transaction alternative where the source for the funds is visible and disclosed to the ultimate beneficiary. Current charge and withdrawal methods for credit and debit cards assume that the source account and approval information for the withdrawal will be provided via the particular card by the cardholder himself at the credit or debit card terminal as part of a single transaction. They require physical interaction by the cardholder (accountholder) with his card at the time the financial transaction occurs.

Money transfers and remote triggered charges use instead cardless temporary approvals with no ownership or pre-assigned destination for their funds. Final destination for the funds is not established by one transaction alone, and the future collection terminal and beneficiary account will not be known until funds are actually delivered to it, that is, if they ever get delivered. It is a one-tier extension to the current single-transaction withdrawal model with the creation of a shield layer between the fund's source account information and its destination.

This abstraction layer is represented by an account approval that is cap-value specific, mostly short-term, single-use with no destination account specification. Such approval is held by a trigger host system connected to the financial network and is worth the source account approval information for a "charge attempt" of a particular cap monetary value based on a logical secret code.

The trigger transfer method is intended to protect the fund's long-term source cash or credit account information from the second transaction agent, providing him no information about the fund's origin and therefore presenting no risk to it. In addition, it is intended to protect the privacy and security of the transaction between terminal and host, separating the process by which the host or terminal acquire the source account approval information for the transaction from the process where the terminal-host private financial transaction and money transfer occurs.

The trigger transfers are intended to occur by unknown direct customer-to-customer interaction minimizing exposure and improving flexibility. Due to the widespread base of charge devices and cash dispensers as well as the extensive array of high and low-end numeric and alphanumeric credit and debit card terminals, the trigger withdrawals and transfers can occur instantly across distances. One can be established, delivered and collected miles apart in a matter of seconds worldwide. Triggers have the option of allowing or not: full or partial funds withdrawal, expiration dates, and other attributes. Security is based on the number of sequences (codes), their size, complexity and lifetime (expiration date).

The present invention provides a service to accounts and institutions connected to a trigger server. The service allows terminals and hosts to accept source account approval information from the trigger server instead of from the accountholder himself, allowing debit and credit requests to the account, to be provided by someone other than the accountholder, who may have no relationship to the account institution. The solution is based on a secret trigger code given to the accountholder when the service is requested.

Checking accounts, money market, investment, credit card, telephone and other instrumentalities can be made trigger-enabled once account terminals or hosts connect to the trigger server. Credit and debit card accounts are the ones used throughout this description to exemplify the invention because of their straightforward implementation and their functionality are easily comprehended. They are the preferred embodiments for this invention, but the invention is not restricted to them.

Although this invention is a general account transaction "assistance service" applicable to any account capable of receiving requests electronically, accounts and terminals referred throughout this are again mostly credit and debit card accounts and their access terminals.

The invention is intended to be used primarily across the wide base of multiple credit and debit card terminals and hosts currently deployed and managed by financial institutions around the globe. The Internet as well as the ATM bank network are preferred access methods for the invention. The system is based on a secret code herein called a "trigger" that is controlled by a trigger host system connected to credit and debit card host and terminal systems.

The trigger system of the invention is a method that provides "electronic money transfer" capabilities to the accounts by supplying the source account approval information to assist credit and debit card transactions. The method is based on a host system capable of collecting, storing and forwarding source account approval information for transactions performed between terminals and hosts across multiple networks. The "trigger host system" or "trigger server" is defined as a computerized apparatus capable of collecting, storing and forwarding account approvals for credit and debit card transactions among terminals and host systems based on secret codes.

A "terminal" is defined as any apparatus capable of providing or receiving account approval information based on secret codes. Input and output terminals are interchangeably referred to herein as purchase and collection terminals; and could at the present time be described as computers, Internet, ATMs, point-of-sale, card blocks, touch-tone phones and other instrumentalities.

The system uses a two-step process one to receive and the other to transmit the source account information for a single credit or debit card transaction request. The trigger host system stores and forwards account and approval information for debits and credits among terminals and hosts based on a secret code, called a trigger.

In a first step, the trigger system collects source account information, cap amount for the transaction and proof of consent from a customer providing a source account, assigning to it a secret trigger code. Service charges for triggers can occur at the purchase or collection stages and are most often extracted from the same source account provided by the purchaser of the service.

At that point any other terminal can attempt to execute the trigger's charge request for an amount less than or equal to the cap amount by using the matching secret code, known only by the purchaser or by someone else with his consent. The trigger system provides the source account and authorization for the transaction to the credit or debit card's host or terminal presenting the matching secret code.

The transaction request is again created in a two-step process comprised of first: collecting data concerning the source account, cap value and authorization information from a credit or debit cardholder and assigning to it a secret code. Second, validating the secret code and providing the source account and approval information to be used in a transactions to the first terminal or host presenting the matching secret code.

By collecting the source account approval information from the trigger server, terminals and hosts are capable of performing cardless transactions as long as either the terminal or host is capable of retrieving the source account approval information for the transaction from the trigger server. No guarantee of money availability is given by the trigger system to the customer purchasing storage for his cap value source account approval information, nor to the subsequent customer attempting the execution of a trigger. The system commits itself to a single successful delivery of the source account approval information to the first terminal or host presenter of the secret trigger code.

The collecting customer, even in possession of a valid trigger, cannot be certain that the account institution will approve the transaction. Upon verification of the secret code, the trigger system's commitment is to supply the source account approval information collected in the first step by the first terminal. Host and terminal will then in a separate transaction, validate or not validate such credit or debit transaction using the source account information provided by the trigger server. A trigger is considered deactivated once it is given to a terminal or host and its status can change once updated by the host or terminal following the end of the transaction. If the account institution approves the transaction, the trigger will be considered executed.

A single trigger can be used multiple times with the same secret code once its purchaser establishes it as a recurring trigger. A recurring trigger is a trigger that is automatically reactivated on a particular date or after a certain period following its execution. It is particularly useful to customers providing regular allowances to others, such as parents sending funds to their children away from home, a few hundred dollars every week or so.

Secret codes can be keyed on a keyboard or provided digitally, optically or magnetically, and copies of the same secret code, can be used to create private "channels" of money transfer between parties likely to transmit and receive funds between each other. One copy of the code can be used to establish the trigger while the other one can be used to collect it, giving the process speed and reliability. The trigger system of private transfer channels allows for easy storage of complex codes that represent no legal value until sender assigns to it a source account and a cap amount. The sender can confirm the receiving of the second copy of the code by the beneficiary before establishing any value to it making such code worthless if intercepted.

It is the responsibility of the customer consenting to a cap-value-charge-attempt to his credit or debit account, to transmit the knowledge of the secret trigger code or the second copy of it to whomever the customer wants to receive the money. The possessor of the secret code will request the execution of the charge on behalf of a destination account provided at the collection terminal. The trigger server can also operate in "blind mode" not being provided by the terminal or host requesting the trigger the ultimate beneficiary account for the funds. Blind mode prevents the trigger server from acquiring information about the beneficiary for a trigger.

This invention is intended to provide financial institutions and their customers, cardless triggered money transfer and payment capabilities through a variety of terminals, allowing the source account information for a single charge transaction to be supplied by a trigger server connected to either the host or terminal performing the transaction instead of directly from the accountholder.

At the present time, numerous authorization methods are available to accountholders for approving transactions on their accounts. Such methods of identification include signatures, electronic pin numbers, ID cards and others. Any terminal or host connected to the trigger server can be used to provide trigger services. Limitations and capabilities of each terminal will ultimately determine the scope of their features. Several electronic devices are currently capable of transferring customer identification between terminals and host systems. The presently deployed electronic transaction approval infrastructure provides customers diversified means of expressing their will of benefiting another account with money from theirs.

Medium-to-long-term accounts such as checking and credit card accounts, capable of accepting electronic transaction approvals are based on accountholder identification requiring the individual requesting the transaction to be one previously registered in the account's profile. When an accountholder writes a check or attempts a withdrawal or credit card transaction, the one requesting the transaction instructs his institution to benefit another account or entity for a predetermined amount of money by presenting a signature or a PIN number as a form of identification. Transactions are authorized once the identity of the requestor is confirmed against his account's profile and the transaction, including its amount, complies with the account's terms and limit.

On electronic transactions, a terminal-host combination verifies that the requestor for the transaction can be confirmed as a legal representative for said account under the account's profile. Such accounts are medium to long-term accounts where the accountholder is expected to perform repetitive use of the account under the terms and limits governing the account and the requesting means.

This invention is an approval store-and-forward support system for medium-to-long-term accounts like checking, credit card, investment and others, allowing predefined cap-amounts to be available through a secret code to other individuals related or not to the account. The system provides money transfer and payment capabilities using existing accounts, access terminals and networks. The invention allows customers to issue and use cap-amount signed blank check-like approvals through a variety of medium-to-long-term accounts and terminals.

Electronic account authorization schemes used today are based on medium-to-long-term accounts where a terminal transmits accountholder identification granting the requestor the use of the account up to the account's limit. The trigger system of the invention is the first to introduce a multi-step single-use account approval store and forward method to provide terminals and hosts the ability to acquire account and approval information from a third party system, the trigger system D, instead of from accountholders themselves, allowing for money transfer and payment capabilities using their current accounts, terminals and network. The system binds charge approvals to secret codes that can be easily transferred to others and used across multiple terminals. Triggered authorizations allow for fixed amount account authorizations to be transferred to others as the right for a predefined cap amount charge attempt against a particular account under predetermined conditions.

The trigger system is a fully automated support system for credit and debit accounts and transactions capable of being electronically transmitted between customers and host systems via electronic terminals. It allows for source account approvals used in credit and debit transaction requests to be received and safely stored (encrypted) by a third party system (the trigger server D) so that account approval can be used later by other terminals through its secret code. It is a system and method for storing and forwarding approvals for accounts capable of being accessed by a terminal host combination.

The trigger system provides source account and approval information for transactions between a terminal and an account institution through electronic transmission methods. It describes a method of capturing, storing and forwarding account and approval information between terminals and hosts.

Previously collected account and approval information are encrypted and stored by the trigger system to be used later via a secret code supplied only to the purchaser of the trigger service. This code can be given to a third party customer to request charges and withdrawals to an account he might be completely unrelated to. The cardless charge or withdrawal request from the second customer who provides the secret code is combined with source account information from the first customer accountholder to fulfill the information required by the terminal and host in order to process the transaction. The system is designed so that it creates a shield between source account information and the beneficiary of the funds, providing him no information about where the money is actually coming from. At the same time, it frees the terminal and host to perform the transaction in privacy without the intervention of the trigger server accounting for more security in the transaction and making its implementation much simpler.

In the trigger system, the trigger host is responsible for providing the source account and approval component of a transaction to a host or a terminal engaging in a transaction. It comprises two steps, first, the collection of the source account approval information, cap amount and a secret code, and second, the provision of the source account approval to the first terminal or host supplying the matching secret code. Except for the fact that a trigger request is not a commitment of money availability, the use of a trigger can be viewed as a cap amount blank electronic check, that can be filled up to its limit by anyone in possession of the check's secret code.

Currently, customers are capable of accessing their accounts by identifying themselves at terminals connected to their institution host system. Trigger-enabled accounts, terminals and hosts provide customers, money transfer capabilities where account owners (customers) authorize account guardians (banks) to credit or debit their account on behalf of another account through an approval previously stored and provided by the trigger server via a secret code. The trigger system can supply the missing source account approval information on a cardless transaction, storing and forwarding approvals under pre-defined terms to other terminals or hosts via a secret code, benefiting whichever account is provided by the requesting terminal.

It creates a system that allows transactions to be built in pieces by multiple terminals at different points in time, where the source account approval information for the transaction, is provided to terminals and hosts by the trigger server instead of by the accountholder himself. Electronic money transfers are understood as any credit or debit instruction capable of being issued by a terminal to a host system through electronic media, requesting the host system to credit or debit a particular account on behalf of another account at the same or other institution. The purpose of the invention is to store and forward approvals for transactions between terminals and hosts, providing access to charges and withdrawals by someone other than an accountholder and who may be unrelated to the institution where the account is maintained. It is a system where the actual requestor and the ultimate beneficiary for the transaction may be unknown to the institution that maintains the source account.

By creating a protocol for an electronic approval store-and-forward system for cash and credit accounts, the present invention presents a solution to the cash flow and liability problem generated by the electronic coin model as well as by other money transfer methods. Because the trigger server is only responsible for supplying the source account approval information for the transaction, it becomes possible to accomplish efficient money transfers using cash and credit accounts at the smallest possible cost of a direct financial transaction between the collection terminal A and the institution maintainer of the source account B. The trigger system supplies institutions with store-and-forward services for credit and debit transactions, allowing source account approvals for charge requests to be provided by the trigger server instead of by the accountholder, under his consent.

It creates a system that supplies account approval information for credit and debit transactions to terminals and account host institutions based on a trigger, committing itself to a single successful delivery of the previously stored source account information to the first presenter of its matching secret code. It will supply approval information to the terminal or host requesting it, so it can be used as if the requestor for the funds were the first credit or debit cardholder, with his card, providing his pin number, at the time and terminal where the request originates. Terminals and hosts on the trigger system perform transactions between each other utilizing approvals collected from the trigger system, instead of from the accountholder.

The system of the invention uses a direct transaction method where a source account institution commits itself to forward funds directly from the source account to the destination account provided by the collection terminal, and where the source account approval information for the withdrawal is received from a trigger server and not from the accountholder. It is understood that multi-bank and other inter-bank transactions might be necessary to deliver funds from the source account and source account institution B to the ultimate beneficiary account and collection terminal A as it exists in the current bank network. The object of the invention is a system to supply account approval information upon secret code verification to transactions between terminals and hosts without participating in the transaction itself and where the actual funds delivered to the requesting terminal A are not provided by the institution supplier of the service, the trigger server D, but by the institution responsible for maintaining the source account B itself in a direct transaction and settlement between B and A.

Since this point-to-point credit or debit transaction is almost identical to currently used credit and debit card charges, fewer changes are required by the institutions involved in implementing the service, making its accomplishment more easily achievable. It avoids not only the complexity and liability included in transferring the money to a temporary holder institution, as an electronic coin or not, as well as it improves inefficiencies derived from the dual transaction scheme like receivable, payable and reconciliation controls required by the institution that temporarily holds the funds. For the "coin" model, coins have to be collected for their full amount, since a separate bank-to-bank transaction would be required to return any change from the coin usage to the sender customer. Previous money transfer methods as well as some coin methods also deprive a customer of his money as soon as the service is purchased, transferring funds from the source account to the funds holding institution C responsible for delivering it. Unclaimed transactions (abandoned property) as well as cancelled and lost "codes" also require separate bank-to-bank reversal transactions in most methods. All this adds to the cost of the service itself as well as to the final price of the service to the consumer.

The foregoing specification and drawings have thus described and illustrated a novel money transfer support system for cash and credit accounts which allows account approval information to be stored and delivered to terminals and host performing transactions among each other, enabling an accountholder to authorize withdrawals and charges to be presented by someone other than the accountholder and who may have no relationship with the institution where the account is maintained, which fulfills all the objects and advantages sought therefor. Many changes, modifications, variations and other uses and applications of the subject invention, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only by the claims which follow.

The invention claimed is:

1. An account lending and borrowing system responsible for collecting, storing and forwarding account information and associated account approval information for use with prospective credit or debit transactions between terminals, on one hand, and hosts of financial institutions that maintain financial accounts and are parties to credit or debit transactions, on the other, enabling account withdrawals and charge requests to be initiated by either an accountholder himself or by someone other than the accountholder, using an authorization code as a substitute for account and associated account approval information, allowing either a terminal or any other party involved in a particular credit or debit transaction to acquire said account and associated account approval information from a non-fiduciary external source, not a party to said transaction and herein called a "trigger server", prior to said transaction reaching it's processing host system and outside of settlement commitments of said credit or debit transaction and its associated parties, as if said account and associated account approval information had been supplied for said transaction directly by the accountholder himself; which account lending and borrowing system comprises:

a) an input terminal in which an accountholder, in a preliminary first communication session, sets up a borrowing account by providing data indicating an account from where funds could be withdrawn or to where charges could be made and, additionally, any associated account approval information required for the effective use of said account, and account use restriction information, if any, comprising the terms and conditions for allowing a subsequent credit or debit transaction to borrow and utilize said previously set up account, which account use restriction information may include a cap value on the amount of said credit or debit transaction, all of which are transmitted to;

b) a trigger server, independent of the financial institution that maintains said account, which stores said account information, as well as said associated account approval information along with said account use restriction information, if any, in association with an authorization code known to the accountholder, and thereafter delivers said account information and associated account approval information, either back to said input terminal or to another party involved in said credit or debit transaction, as a separate communication session, prior to said credit or debit transaction reaching its processing host system ultimately responsible for approving or denying the transaction, such delivery by the trigger server, of the previously set up borrowing account in response to a request, carrying the associated authorization code, provided that verification of said authorization code is successful, and that said credit or debit transaction complies with said account use restriction information, if any, as initially set by the accountholder; and c) a requesting terminal, set to participate in said credit or debit transaction with a host, which at a subsequent point in time receives an authorization code from a presenter, not necessarily the owner of the account to be used in said transaction, as an alternate payment method for said credit or debit transaction, and transmits said authorization code to said trigger server, along with additional information, if any, about said credit or debit transaction, in a request for acquiring said account and associated account approval information from the trigger server, said request to the trigger server being a separate communication session independent of the credit or debit transaction itself and prior to said credit or debit transaction reaching its financial institution's processing host system ultimately responsible for approving or denying the transaction, enabling said financial institution's processing host system to receive said transaction along with said acquired account and associated account approval information necessary for the effective use of the account, in place of the authorization code initially presented to said requesting terminal as an alternative payment method for said credit or debit transaction, said account and associated account approval information to be used in said credit or debit transaction between said requesting terminal and host, as if said acquired account and its associated account approval information had been supplied for said credit or debit transaction directly by the accountholder himself, and provided that said credit or debit transaction complies with said account use restriction information, if any, as initially set by the accountholder.

2. A system as claimed in claim 1, wherein the input terminal includes means for collecting and transmitting said data to said trigger server, comprising at least one of an automated teller machine, a credit or debit card block, a point of sale machine, a personal computer, a lotto machine, a touch-tone telephone, a fax machine, and a wireless device.

3. A system as claimed in claim 1, wherein the input terminal generates a random authorization code, and transmits said authorization code to the trigger server for storage and association with said account and account approval information.

4. A system as claimed in claim 1, wherein the authorization code is established by the sender via keyboard input, digitally, optically or magnetically.

5. A system as claimed in claim 1, wherein the input terminal also includes at least one of a monitor screen, a barcode reader, a printing device, a magnetic-card writer and a magnetic card reader.

6. A system as claimed in claim 5, wherein the authorization code is printed as numbers, letters, symbols, or barcode, or is digitally, magnetically or optically stored.

7. A system as claimed in claim 1, wherein the requesting terminal includes means for transmitting said authorization code to said trigger server, comprising at least one of an automated teller machine, a credit or debit card block, a point of sale machine, a personal computer, a lotto machine, a fax machine, a wireless device and a touch-tone telephone.

8. A system as claimed in claim 1, wherein the requesting terminal also includes at least one of a monitor screen, a printing device, a barcode reader and a magnetic card reader.

9. A system as claimed in claim 1, wherein the account is any account capable of being authorized electronically, including at least one of a credit account, a checking account, a savings account, a money market account, an investment account and a telephone account.

10. A system as claimed in claim 1, which further comprises means at the requesting terminal for entering personal identification.

11. A system as claimed in claim 10, wherein said identification is input via at least one of a keyboard, a magnetic or digital card, and a barcode reader.

12. A system as claimed in claim 1, wherein the accountholder is charged a service charge at the input terminal.

13. A system as claimed in claim 1, wherein a service charge is imposed at the requesting terminal.

14. A system as claimed in claim 1, which further comprises means for entering a beneficiary account to where money should be remitted.

15. A system as claimed in claim 14, wherein said beneficiary account is an account capable of receiving funds electronically, including at least one of a checking account, a money market account, an investment account, and a savings account.

16. A system as claimed in claim 14, wherein the beneficiary account is entered via at least one of a magnetic or digital card, keyboard input, and a barcode reader.

17. A system as claimed in claim 1, wherein the input terminal is capable of receiving and transmitting additional terms and conditions for the use of said accounts.

18. A system as claimed in claim 17, wherein said server is capable of storing said terms and conditions for the use of the accounts in association with said authorization codes.

19. A system as claimed in claim 18, wherein said requests for said data include additional information about said transactions.

20. A system as claimed in claim 19, wherein said additional terms and conditions include at least one of (1) a cap value on the amount of the transaction, (2) dates and times when the use of the account could or could not be permitted, and (3) the identity of payees to which the use of the account is or is not allowed.

21. A system as claimed in claim 20, wherein said server transmits said account information to said requesting terminal only if said transactions comply with said terms and conditions.

22. A method for borrowing and lending accounts that enables collection, storage and delivery of account information and associated account approval information for use with prospective credit and debit transactions between terminals and hosts of financial institutions that maintain financial accounts and are parties to said transactions, allowing account withdrawals and charge requests to be initiated by either an accountholder himself or by someone other than the accountholder, using an authorization code as a substitute for account information and associated account approval information, enabling either a terminal or any other party involved in said credit or debit transaction to acquire said account information and associated account approval information from a non-fiduciary external source, not a party to the transaction itself and herein called a "trigger server", prior to said charge request reaching its financial institution's processing host system ultimately responsible for approving or denying the transaction and outside of any settlement commitments related to said credit or debit transaction and its associated parties, as if said account information and associated account approval information had been supplied for said credit or debit transaction by the accountholder himself, which method for borrowing and lending accounts comprises the steps of:

a) setting up a borrowing account for an accountholder who has said account at a financial institution, by providing data indicating (1) an account from where funds could be withdrawn or to where charges could be made, (2) any associated account approval information necessary for the effective use of said account, and (3) account use restriction information, if any, comprising the terms and conditions for allowing a subsequent credit or debit transaction to utilize said account, which account restriction information may include a cap value on the amount of said credit or debit transaction;

b) transmitting said data to a trigger server, independent of the financial institution that maintains the account, which trigger server stores said account information, said associated account approval information and said account use restriction information, if any, for said account, in association with an authorization code known to said accountholder;

c) entering said authorization code at a requesting terminal, as an alternate payment method for said credit or debit transaction between said terminal and the host of the financial institution involved in the transaction;

d) causing a request to said trigger server, from either said requesting terminal or any other party involved in said credit or debit transaction, containing said authorization code as well as additional information about said credit or debit transaction, if available, in an attempt to acquire said previously set up account information and associated account approval information associated with said authorization code, in a separate communication session prior to said credit or debit transaction reaching its processing host system ultimately responsible for approving or denying the transaction, said borrowed account to be used as the withdrawal or charge account for said credit or debit transaction, by the parties involved in the transaction;

e) the trigger server verifying authenticity of said authorization code as well as compliance of said credit or debit transaction with terms and conditions associated with said authorization code, if any, as previously set by said accountholder;

f) the trigger server delivering to said terminal or to another party involved in said transaction, the account information and associated account approval information associated with said authorization code upon validation of said entered authorization code, and prior to said credit or debit transaction reaching its processing host system ultimately responsible for approving or denying the transaction;

g) the trigger server enabling said processing host system to receive and utilize said account and associated account approval information as the charge or withdrawal account for said credit or debit transaction without further participating in any liability related to the outcome of said transaction; and h) allowing said credit or debit transaction to occur between said terminal and host utilizing said acquired account information and associated account approval information from said trigger server, as if said account information and associated account approval information had been supplied for said credit or debit transaction directly by said accountholder himself.

23. A method as claimed in claim 22, wherein accountholder is charged a service charge at the input terminal.

24. A method as claimed in claim 22, wherein a service charge is imposed at the requesting terminal.

25. A method as claimed in claim 22, which further comprises entering a beneficiary account to where money should be remitted.

26. A method as claimed in claim 25, wherein said beneficiary account is an account capable of receiving funds electronically, including at least one of a checking account, a money market account, an investment account, and a savings account.

27. A method as claimed in claim 25, wherein the beneficiary account is entered via at least one of a magnetic or digital card, keyboard input, and a barcode reader.

28. An account lending and borrowing system for collecting, storing and delivering data relating to chargeable financial accounts for use in credit and debit transactions, based upon authorization codes, from a computer server, called a "trigger server", that is independent of the financial institutions that maintain said accounts and any other entities that are parties to said transactions, said account lending and borrowing system comprising, in combination:

a) a trigger server which receives and stores data defining a plurality of chargeable borrowing accounts for use in prospective credit and debit transaction requests, as well as any additional information required for the effective use of said accounts, along with an authorization code associated with each account, and thereafter delivers said stored data either back to a terminal or to another party to said transaction, prior to said credit or debit transaction request reaching its processing host system ultimately responsible for approving or denying said transaction, said trigger server having no further participation in said transactions and being independent of the financial institution that maintains each account;

b) an input terminal which receives said data from accountholders and transmits said data to said trigger server in order to set up borrowing accounts; and c) a requesting terminal which receives authorization codes from users and transmits them to said trigger server to acquire borrowing account data for use in effecting said transactions;

wherein said authorization codes are responsible for acquiring from said trigger server, account information and associated account approval information necessary for the effective use of said accounts in said credit or debit transactions, prior to said transaction requests reaching their respective financial institutions' processing host systems ultimately responsible for approving or denying said requests;

whereby said users may be said accountholders or persons acting in behalf of said accountholders.

29. A system as claimed in claim 28, wherein the input terminal is capable of receiving and transmitting additional terms and conditions for the use of said accounts.

30. A system as claimed in claim 29, wherein said server is capable of storing said terms and conditions for the use of the accounts in association with said authorization codes.

31. A system as claimed in claim 30, wherein said requests for said data include additional information about said transactions.

32. A system as claimed in claim 31, wherein said additional terms and conditions include at least one of (1) a cap value on the amount of the transaction, (2) dates and times when the use of the account could or could not be permitted, and (3) the identity of payees to which the use of the account is or is not allowed.

33. A system as claimed in claim 32, wherein said server transmits said account information to said requesting terminal only if said transactions comply with said terms and conditions.

34. A lending and borrowing method responsible for collecting, storing and delivering financial accounts for use in credit and debit transactions, based upon authorization codes, from a computer server, herein called a "trigger server" not a party to said transactions and independent of the financial institutions that maintain said accounts, which lending and borrowing method comprises the steps of:

a) collecting data defining a plurality of chargeable borrowing accounts for use in credit and debit transactions, as well as any additional information required for the effective use of said accounts;

b) transmitting said borrowing account data to a trigger server, not a party to said transactions and independent of the financial institutions that maintain said accounts;

c) said trigger server confirming receiving and storing said data in association with an authorization code for the account;

d) entering authorization codes at a requesting terminal;

e) transmitting requests for acquiring said borrowing account data to said trigger server, utilizing said entered authorization codes; and f) said trigger server validating said requests and delivering said borrowing account data associated with said entered authorization codes for use in said transactions, prior to said transactions reaching their respective processing host systems ultimately responsible for approving or denying said transactions, and with no further involvement of said trigger server in said transactions.

35. A method as claimed in claim 34, wherein said step of entering the authorization code at a requesting terminal further comprises a step of entering personal identification.

36. The method as claimed in claim 34, further comprising the steps of transmitting to said server, in addition to said data, terms and conditions for use of an account, and storing said terms and conditions in said server in association with said data about said account and said associated authorization code.

37. The method as claimed in claim 36, further comprising the steps of transmitting additional information about transactions to said server, in addition to said request for acquiring said data for said transaction, and validating said request only if the transaction complies with said terms and conditions.

\* \* \* \* \*